United States Patent [19]

Stutz

[11] 4,373,266

[45] Feb. 15, 1983

[54] EQUIPMENT FOR CONTINUOUSLY MEASURING THE LENGTH OF AN ENDLESS MATERIAL BEING WOUND UP INTO A CIRCULAR PACKAGE

[75] Inventor: Hansruedi Stutz, Dietlikon, Switzerland

[73] Assignee: Loepfe Brothers Limited, Zürich, Switzerland

[21] Appl. No.: 313,208

[22] Filed: Oct. 20, 1980

[30] Foreign Application Priority Data

Nov. 5, 1980 [CH] Switzerland .................. 8212/80

[51] Int. Cl.³ ............................................. G01B 19/04
[52] U.S. Cl. .................................. 33/129; 33/172 F; 33/125 C; 242/36
[58] Field of Search ............... 33/129, 132 R, 132 A, 33/133, 134 R, 134 A, 125 A, 125 C, 172 F, 363 K; 242/36

[56] References Cited

U.S. PATENT DOCUMENTS 3,024,986 3/1962 Strianese et al. .................. 33/125 C
3,229,103 1/1966 Rantseh et al. ................... 33/125 A X
4,024,645 5/1977 Giles .................................. 33/172 F

FOREIGN PATENT DOCUMENTS 1231020 12/1966 Fed. Rep. of Germany .... 33/172 F

*Primary Examiner*—William D. Martin, Jr.
*Attorney, Agent, or Firm*—Werner W. Kleeman

[57] ABSTRACT

Equipment for continuously measuring the length of an endless material, such as a yarn, which is being wound up on a machine into a circular package, the machine comprising a movable member whose position depends upon the diameter of the package. The measuring equipment comprises a movable transfer member mechanically coupled to the movable member of the machine, and therewith cooperating photoelectrical sensing means for generating a sensing signal indicative of the position of the movable member at each revolution of the package. There is further provided electronic circuitry for continuously evaluating consecutive sensing signals and generating therefrom a digital signal representative of the length of the yarn wound up into the package.

1 Claim, 8 Drawing Figures

EQUIPMENT FOR CONTINUOUSLY MEASURING THE LENGTH OF AN ENDLESS MATERIAL BEING WOUND UP INTO A CIRCULAR PACKAGE

BACKGROUND OF THE INVENTION

The present invention relates to new and improved equipment for continuously measuring the length of endless material which is being wound upon a rotating core into a circular package, the machine comprising a movable member whose position depends upon the diameter of the circular package.

Measuring equipment of this type is disclosed in U.S. Pat. No. 4,024,645. There, the angular position of a swivel arm which bears upon a cylindrical yarn package formed on a yarn winding machine is mechanically transferred to the tap of a potentiometer whose setting controls the frequency of an oscillator. This frequency is transmitted, through a gate which is opened twice during respective 1.2 milliseconds intervals during each revolution of the winding coil, to a counter indicating the length of the wound-up yarn. The counter is reset by an adjustable device when a predetermined count is achieved, and the winding device is simultaneously stopped.

The potentiometer of this known measuring device, constituting part of a mechanoelectrical position sensor, is deficient insofar as the resistance member of the potentiometer is soon worn out by the thereon sliding contact member, which impedes any further exact measurement. This drawback is additionally intensified by the vibrations of the swivel arm occurring during the operation of the winding machine which are transmitted to the sliding contact member and soon cause the potentiometer to deteriorate or become useless.

SUMMARY OF THE INVENTION

It is therefore a primary object of the present invention to provide an improved construction of yarn length measuring equipment, which overcomes the aforementioned deficiencies and limitations of the prior art discussed herein.

This is achieved by the features that the equipment comprises a movable transfer or transmission member mechanically coupled to the movable member of the machine, and a stationary transducer means for sensing the position of the transfer member without contacting the same and producing a sensing signal during each revolution of the package depending upon the diameter thereof. A cycle or clock signal generator produces a cycle or clock signal during each revolution of the pacakage for controlling the outset or delivery of the sensing signal. A counting pulse generating means serves for generating a continuous series of counting pulses independent of the position of the transfer member. There is also provided circuitry for generating a digital length measuring signal from the counting pulses and sensing signal occurring upon each cycle signal, and means for summing up consecutive digital length measuring signals.

The inventive position sensing device avoids the use of a potentiometer having a sliding contact. Instead, the position of the movable member of the machine is detected by contactlessly operating sensing means, thus eliminating wear resulting from the use of a potentiometer or other adjustable resistor device.

BRIEF DESCRIPTION OF THE DRAWINGS

The invention will be better understood and objects other than those set forth will become apparent when consideration is given to the following detailed description thereof. Such description makes reference to the annexed drawings wherein.

DETAILED DESCRIPTION OF THE PREFERRED EMBODIMENTS

Figure 1:
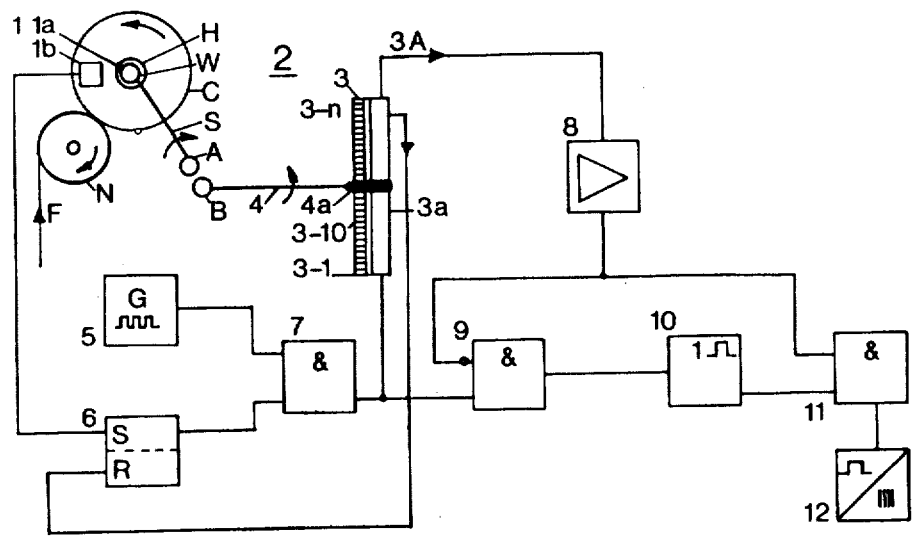
FIG. 1 illustrates a first embodiment of the inventive length measuring equipment along with some therewith cooperating components of a yarn winding machine in order to facilitate understanding of the invention.

With reference now to FIG. 1, there are shown therein some components of a conventional yarn winding machine. In particular, there will be seen a tube or core H with a yarn package C wound thereon and which is rotatable about a rotation axis W supported at the free end of a swivel arm S. This swivel or pivotal arm S is pivotably mounted at a swivel or pivot axis A fixed to the winding machine. The package C can be rotated by a grooved winding drum N which also serves for guiding the yarn F which is being wound-up onto the package C.

For producing a clock or cycle pulse or cycle signal during each revolution of the pacakage C, there is provided a cycle or clock pulse generator 1 comprising, for instance, in conventional manner, a magnet 1a fixed to the rotation axis W, and an induction coil 1b fixedly mounted at the frame of the winding machine.

A non-contacting or contactless position sensing device 2 is provided for sensing the position of the swivel or pivotal arm S. The position sensing device 2 comprises a linear array 3 of transducer elements 3-1 through 3-n fixed mounted at the machine, and a transfer member or pointer 4 which is mechanically coupled to the swivel arm S such as to be pivotable about a swivel axis B. The free end of the pointer 4 bears an index member 4a arranged such that the latter passes over the entire length of the transducer array 3 between the transducer elements 3-10 and 3-n when the swivel arm S moves from an initial position where the diameter of the tube H is sensed, i.e. with no package or winding thereon, to an end position corresponding to a maximum package diameter.

The transducer elements 3-1 through 3-n may be photosensors which are illuminated by a light source (not shown). At any time, one of the transducer elements is shaded or covered by the index member 4a, thus defining the position of the swivel arm S and as a consequence the corresponding value of the diameter of the package C. During the winding process, the swivel arm S is rotated clockwise, whereas the index member or pointer 4 is rotated counterclockwise, such that the index member 4a moves upward along the array 3 beginning with photosensor 3-10.

A shift register 3a which is operatively associated with the array 3 in conventional manner has a sensor pulse output 3A.

Now the switching circuits 5 through 11 which serve for obtaining a length measuring signal 11A, FIG. 2, and the function of these circuits will be described in detail. The circuits 5,6,7 are provided for producing, with each revolution of the package C, a series of scanning pulses 7A, FIG. 2, for scanning the condition of the transducer array 3. A counting pulse generator 5 continuously generates counting pulses 5A, FIG. 2, which are supplied to one input of an AND-gate 7 having two inputs and whose output is connected to the input of the shift register 3a at the location of transducer element 3-1. Normally, that means as long as the cycle or clock pulse generator 1 furnishes no cycle or clock pulse, the AND-gate 7 locks the counting pulses 5A. The induction coil 1b of the cycle pulse generator 1 is connected to the set terminal S of an RS-flipflop 6 whose reset terminal R is connected to a reset ouput of the transducer array 3 at 3n. The output of the RS-flipflop 6 is connected to the second input of the AND-gate 7.

Figure 2:
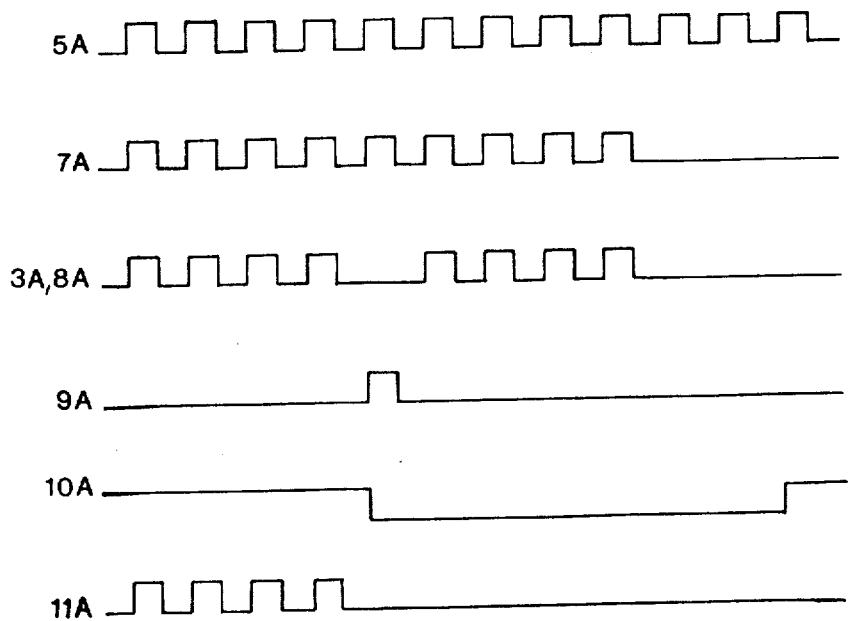
FIG. 2 is a representation of some pulse diagrams illustrating the mode of operation of the equipment shown in FIG. 1.

When a cycle or clock pulse is furnished, i.e. with each revolution of the package C, the leading edge of this cycle pulse sets the RS-flipflop 6, and the output thereof jumps from logic "0" to logic "1." By means of the logic "I" signal, the AND-gate 7 is unlocked or enabled such that the counting pulses 5A generate a series of scanning pulses 7A, FIG. 2, which appear at the output of the AND-gate 7. By means of these scanning pulses 7A the transducer array 3 is scanned, producing a series of sensor pulses 3A, FIG. 2. By means of the last scanning or interrogation pulse of the series 3A, the RS-flipflop 6 is reset, again locking or disabling the AND-gate 7 for the counting pulses 5A.

The series of sensor pulses appearing at 3A on the output line of the array 3 is amplified in an amplifier 8 such as to furnish amplified sensor pulses 8A as shown in the third line in the pulse diagram of FIG. 2. An inspection thereof readily reveals that one pulse is missing in the middle of this series; this gap indicates a transducer element in the middle of the array 3 which is shaded by the index member 4a.

The further circuits 9,10,11 serving for the deduction of the length measuring signal 11A comprise a second AND-gate 9 having a non-negated and a negated input, a monoflop 10, and a third AND-gate 11. A counter 12 is connected to the output of this AND-gate 11 for summing up the consentive length measuring signals or length measuring pulses 11A, and thus provides an indication of the total length of the yarn wound-up in the package C.

The second AND-gate 9 forms the difference of the pulse series 7A and 8A and furnishes an output signal as shown at 9A, i.e. in the present embodiment a single position pulse which is supplied to the monoflop 10. The latter provides a single negative going locking pulse 10A whose predetermined duration is somewhat longer than that of the series of scanning pulses 7A.

The pulses 8A and 10A are combined by the subsequently connected third AND-gate 11 such as to produce a series of length measuring pulses 11A. The number of the single pulses of the series 11A is indicative of the number of the non-shaded photoelectrical sensors of the row which begins at 3-1 and ends with the last non-shaded sensor antecedent to the index member 4a. A single series of length measuring pulses 11A is representative of the length of a single yarn winding in the package C, and the result of the count in the counter 12 indicates the total length of the yarn in the package C as stated above.

Figure 3:
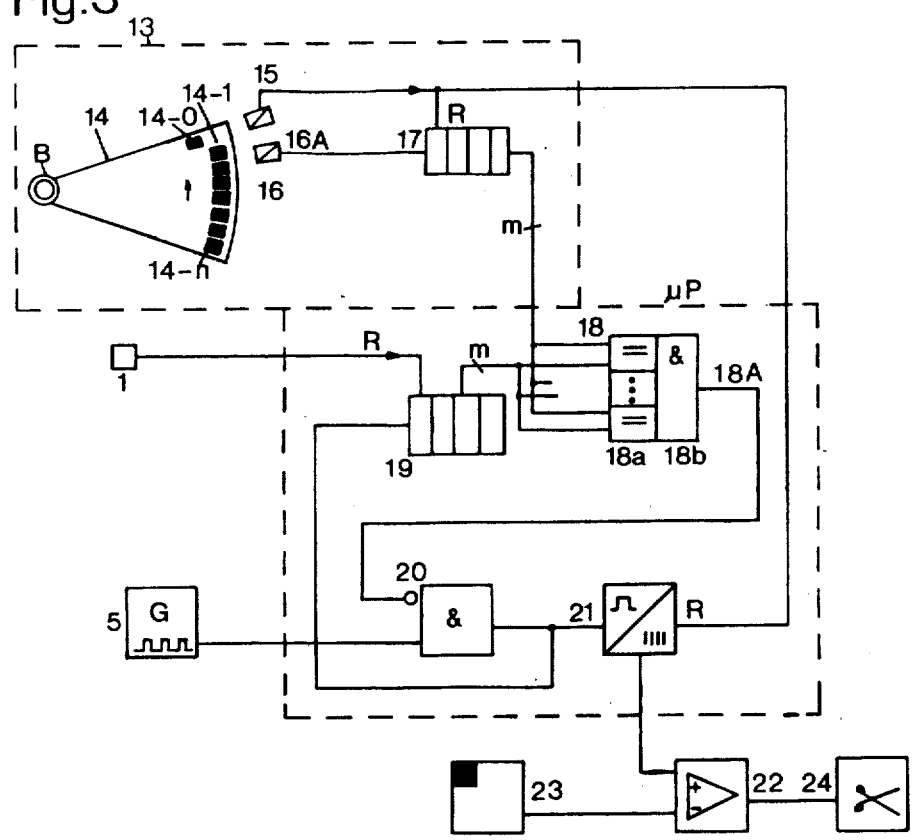
FIG. 3 illustrates a second embodiment of the length measuring equipment according to the invention.

With reference to FIG. 3, there is shown a position sensing device 13 comprising, firstly, a transfer member or sector 14 pivotable about a swivel axis B as in FIG. 1. Sector 14 is provided with position marking devices or markers 14-0 through 14-n, namely a single perforation 14-0 and an arched array of perforations 14-1 through 14-n. Secondly, the position sensing device 13 comprises two stationary photosensors 15,16, and thirdly, a shift register 17 connected to these photosensors 15, 16.

The perforation 14-0 serves as a start position marker, and the perforations 14-1 through 14-n as angular position markers. The first angular position marker 14-1 is displaced towards marker 14-0 by an amount slightly more than the width of the perforation 14-0 in the peripheral direction of the sector 14. The photosensors 15,16 are located such that a sensing signal is produced when one of them is illuminated by a light source (not shown) through one of the perforations 14-0 or 14-1 through 14-n, respectively. In the initial position, i.e. with an empty tube H, FIG. 1, the first photosensor or reset sensor 15 senses the start position marker or perforation 14-0, whereas the second or angular position photosensor 16 is shaded by the sector 14 and does not produce a sensing signal.

To the reset sensor 15 there are connected the reset terminal R of the first shift register 17 and the reset terminal R of a counter 21. The angular position sensor 16 is connected to the signal terminal of the first shift register 17. The first shift register 17 has m output lines for producing an m-digital output signal in parallel form, dependent upon the angular position of the sector 14 and indicative of the length of one winding of the package C. The m output lines of the first shift register 17 are individually connected to m first input terminals of a digital comparator 18 having m second input terminals connected to the m output lines of a second shift register 19. The digital comparator 18 comprises a series of m equivalence or logic identity gates 18a each of which has two inputs, and an AND-gate 18b having m input terminals individually connected to the outputs of the m equivalence gates 18a.

The first shift register 17 is preset such as to produce, prior to the sensing of the first angular position marker 14-1 by the photosensor 16, a digital output signal having e.g. a decimal value hundred representative of the circumference of the emtpy tube H, FIG. 1. Now when the transfer member or sector 14 rotates counterclockwise during the winding process, upon each transition to the following marker 14-1, 14-2, 14-3 and so on, the initial value of the output signal of the shift register 17 is increased by a certain amount. The second shift register 19 initially is set to zero. The reset terminal R of the second shift register 19 is connected to the cycle or clock pulse generator 1 such that this shift register 19 is reset to zero by each cycle or clock pulse.

The output 18A of the digital comparator 18 is connected to a first negated input of an AND-gate 20 whose second non-negated input is connected to the output of a counting pulse generator 5. The output of the AND-gate 20, firstly, is connected to the input of the counter 21, and secondly, to the signal input of the second shift register 19.

Now the mode of operation of the length measuring equipment shown in FIG. 3 will be described in a simplified manner.

Figure 4:
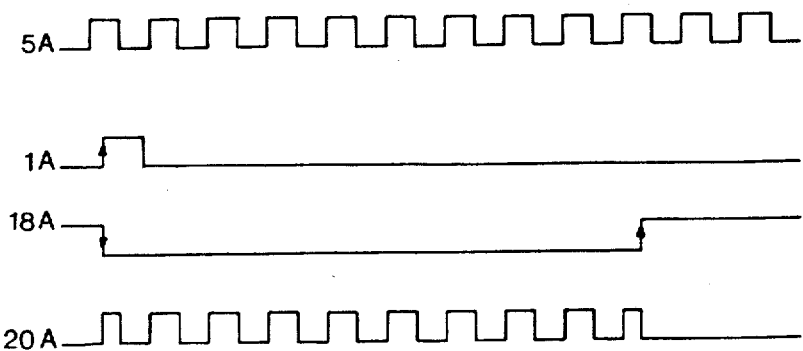
FIG. 4 is a schematic pulse diagram serving for explaining the mode of operation of this second embodiment depicted in FIG. 3.

With the first revolution of the package C, FIG. 1, and prior to the occurrence of a cycle or clock pulse 1A, FIG. 4, the digital output signals of the first and second shift registers 17,19 are distinct: the first shift register 17 may furnish the value one hundred, the second shift register 19 a zero. As a consequence, the output signal 18A of the first comparator 18 is a zero which keeps, through the negated input thereof, the AND-gate 20 open or enabled. This causes the counting pulses 5A from counting pulse generator 5 to pass to the second shift register 19 and the counter 21 wherein they are counted. Now when the second shift register 19 has reached the same count as the first shift register 17, i.e., hundred, the output signal 18A of the first comparator 18 jumps to a logic "I" such that the AND-gate 20 is locked or disabled and the counting pulses 5A cannot pass through.

Now when the first cycle pulse 1A, FIG. 4, occurs, the output signal of the second shift register 19 is reset to zero, and the count up to hundred begins anew; this process is repeated upon each cycle pulse 1A. Every time, a series of e.g. one hundred counting pulses 5A is added to the count in counter 21. This procedure is repeated as long as—by the increase of the package C and rotation of the sector 14—the marker 14-1 uncovers the angular position sensor 16, producing a position sensing pulse which sets the first shift register 17 to the value one hundred and one. This new value represents the increased length of a single winding of the yarn on the package C. Every time a further marker or perforation 14-2, 14-3 is brought to cooperate with the angular position sensor 16, the first shift register 17 is shifted by an other unit or one, i.e. to one hundred and two, one hundred and three and so forth.

When the sector 14 and the row of markers or perforations 14-1 through 14-n are correctly dimensioned, the number of counting pulses 5A which is added to the count in counter 21, with each revolution of the package C, exactly represents the length of yarn winding wound-up at this revolution.

The circuits 22,23,24 are provided for stopping or interrupting the winding process as soon as a predetermined count of the counter 21 is attained, i.e. when a predetermined length of yarn is wound onto the package C, and thereupon to sever the yarn F, FIG. 1, travelling to the grooved winding drum N.

For this purpose, there is provided a second comparator 22 having two inputs, the first input being connected to the output of the counter 21 and the second input to a set point device 23. As soon as the count in counter 21 reaches the value set by the set point device 23, the second comparator 22 produces an output signal which actuates a severing device 24 and simultaneously stops the winding machine.

The package C is taken-off the winding machine at the end of the winding process. A new tube H is placed upon the axis W, FIG. 1, and the swivel or pivotal arm S is brought into the initial position thereof. The sector 14 also returns to its initial or starting position, and the reset sensor 15 is actuated and resets the first shift register 17 and the counter 21 to the initial conditions thereof; then another winding process may begin.

With the length measuring equipment illustrated in FIG. 1 the linear array 3 is fixedly mounted at the frame of the machine, whereas the pivotable pointer 4 follows the movement of the swivel or pivotal arm S of the winding machine. Conversely, with reference to FIG. 3, the linear array or row of markers 14-1 through 14-n is fixedly arranged at the pivotable sector 14 which like the pointer 4, FIG. 1, follows the movement of the swivel arm S. However, in both of these embodiments the angular position of the swivel arm S is detected by means of sensors 3-1 through 3-n or 16, respectively, which are fixed at the machine.

Figure 5:
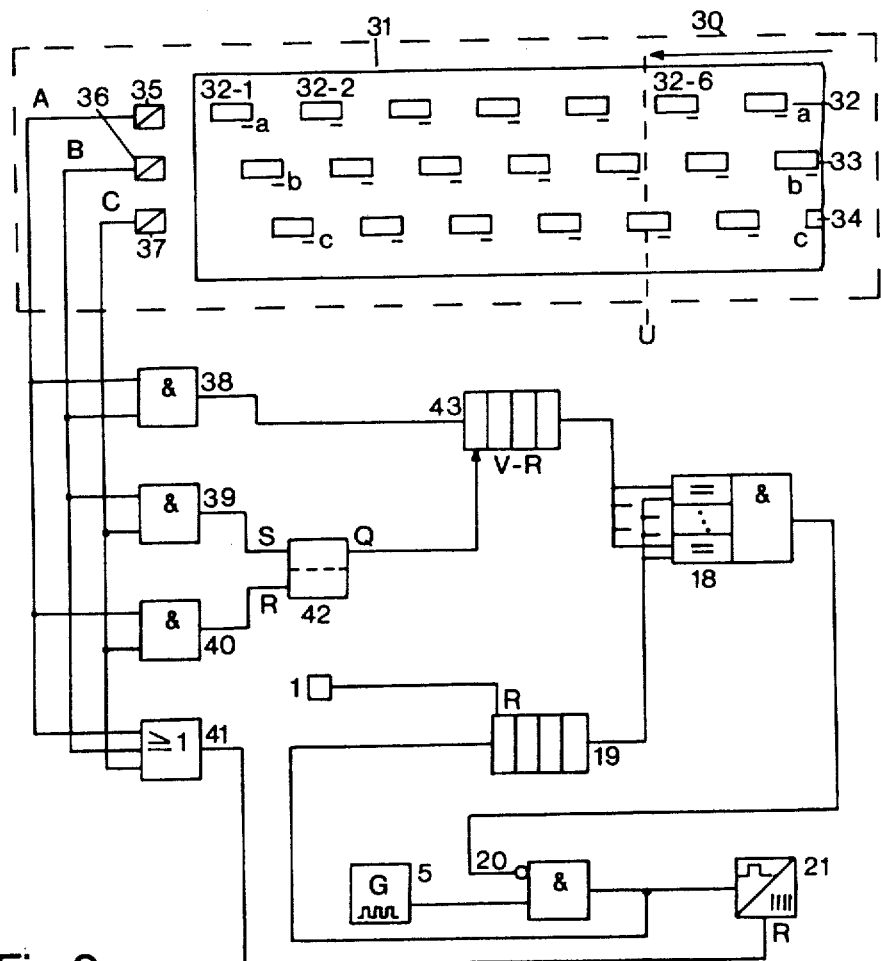
FIG. 5 illustrates a third embodiment of the length measuring equipment according to the invention.

The embodiment of length measuring equipment shown in FIG. 5 takes into account the fact that the swivel arm S, FIG. 1, possibly undergoes, during the winding process, slight reciprocating motions or oscillations about a middle or central position. As a consequence, with increasing diameter of the package C the swivel arm S is not continuously pivoted in one and the same direction. In this event, the equipment shown in FIG. 3 would furnish oversized length values of the yarn windings since only the greatest angular deviation of the swivel arm S is measured. By specific measures, particularly the use of three parallel rows of perforations, three sensors and a bidirectional counter 43 in place of the forward counting shift register 17 of FIG. 3, these reciprocating motions and the thereby caused fluctuations of the length measuring signals are averaged by the modified form of equipment shown in FIG. 5.

With reference now more specifically to FIG. 5, there is schematically shown a position sensing device 30 which comprises a transfer member 31 provided with three parallel rows 32, 33,34 of equidistant oblong perforations or holes, such as 32-1, 32-2 and so forth, and three position sensors 35,36,37. The rows 32,33,34 may be arched i.e. lie along an arc as shown in FIG. 3 for the perforations or holes 14-1 through 14-n, and located on a pivotable sector. Each of the rows 33,34 is staggered relative to the preceding row 32 or 33, respectively, as shown, such that the oblong or lengthwise extending rectangular perforations of two adjacent rows overlap by about one-third of their longitudinal dimension; thus the sensing signals from the sensors 35, 36,37 temporarily coincide. A light source (not shown) or a common light source is provided for each of the sensors 35,36,37 and fixedly mounted at the frame of the machine.

One of the rows, e.g. row 32, and the therewith cooperating sensor 35 would be sufficient for detecting the position of the swivel arm S, FIG. 1, as described with reference to FIGS. 3 and 4. The two additional rows 33,34 and the sensors 36,37 render possible the desired averaging of the above-mentioned fluctuations as now will be described in detail in the following portion of this disclosure.

The output lines A,B,C of the sensors 35,36,37, respectively, are connected to three AND-gates 38,39,40, each having two inputs, and an OR-gate 41 having three inputs, in the following manner: lines A and B lead to the two inputs of the AND-gate 38, lines B and C lead to the two inputs of the AND-gate 39, lines A and C to the two inputs of the AND-gate 40, and the three lines A,B,C individually lead to the three inputs of the OR-gate 41. The two outputs of the AND-gates 39,40 are connected to the S-terminal and R-terminal of an RS-flipflop 42, whose output Q is connected to reverse terminal V-R of the bidirectional or up-down counter 43, e.g. a shift register. The signal or counting input of this counter 43 is connected to the output of the first AND-gate 38.

The remaining circuits 1,5,18,19,20,21 are of the same type and function as the corresponding circuits shown in FIG. 3. It is obvious that the bidirectional counter 43 takes the place of the shift register 17, FIG. 3, which counts only in forward direction. The reset terminal R of the counter 21 is connected to the output of the OR-gate 41. Thus, this counter 21 is automatically reset to zero when the transfer member 31 is returned to its initial position; in this event, all the signals on the lines A,B,C are zero.

Now with reference to FIG. 6 there will be described the mode of operation of the circuits shown in FIG. 5, with various directions of movement of the transfer member 31. First, the movement of the transfer member 31 with increasing diameter of the package C will be considered, i.e. when the latter moves in a direction from the right towards the left in FIG. 5 over the fixed sensors 35,36,37.

Figure 6:
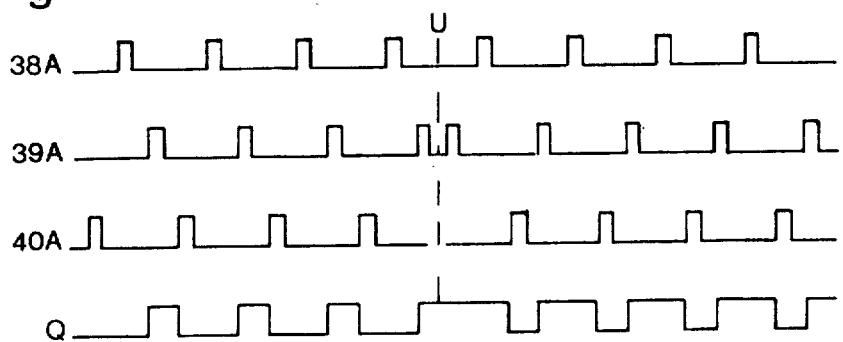
FIG. 6 is a schematic pulse diagram illustrating the operation of the third embodiment of FIG. 5.

In FIG. 6, the first line shows the output signals 38A of the AND-gate 38. Here, a single pulse occurs every time the sensors 35 and 36 or the lines A and B simultaneously furnish a sensing signal. This coincidence is indicated by the dashes a between the rows 32 and 33. The output pulses 39A of the AND-gate 39 are delayed by a fixed interval with respect to the output pulses 38A, and the output pulses 40A of the AND-gate 40 are delayed by the same fixed interval with respect to the output pulses 39A.

In FIG. 5, the vertical dashed line U marks a cross-section on the transfer member 31 where the movement direction thereof is reversed when this line U reaches a position just over the sensors 35,36,37. This instant is marked in FIG. 6 by the vertical dashed line U. Thereupon, the rows 32,33,34 are scanned in a reverse direction producing the pulses 38A,39A,40A shown at the right hand side of the line U in FIG. 6.

The last line shows the output signals Q of the RS-flip-flop 42 which is set by the leading edges of the pulses 39A and reset by the leading edges of the pulses 40A. Thus, with scanning in forward direction, i.e to the left of line U, short positive going pulses Q are produced which do not coincide with the pulses 38A; with the scanning in reverse direction longer pulses Q, as shown to the right of line U, are generated which temporarily coincide with the pulses 38A. The pulses 38A to the left of the line U are counted in the bidirectional counter 43 in forward direction, that means they are summed up, whereas the pulses to the right of the line U are subtracted. Under practical operating conditions, such a subtraction occurs only in short intervals, reducing the value supplied to the comparator 18 by a small amount, such short intervals are followed by an increase in the counting operation.

The sum counted in the first counter 21 and representing the number of counting pulses coming from counting pulse generator 5 by means of the AND-gate 20, continually increases during the winding operation, and the bidirectional counter 43 defines the number of counting pulses to be counted within each revolution of the package C.

The array of markers may be an array of transducer elements 3-1 through 3-n, FIG. 3, arranged along an arc of a circle. Such an arrangement is preferable when the package C is mounted on a swivel arm S, FIG. 1. In some winding machines, the axis W of the package C moves along a straight vertical line during the winding process, lifting the package C in vertical direction. With this embodiment a linear array of the markers 32-1, 32-2 and so forth as shown in FIG. 5 is preferable. A transmission gear may be provided between the member, bearing the package C, such as the swivel arm S, FIG. 1, and the transfer member, such as the pointer 4 in FIG. 1 or the sector 14 in FIG. 3. The gearing may be constructed such that when the rotation axis W of the package C is moved along a linear path, the transfer member is rotated, or vice versa; otherwise, the angle of the pivoting movement of the arm S, FIG. 1, may be increased, i.e. such that the pointer 4 swivels at a higher angular speed than the arm S.

The number of the elements or position markers of the array, e.g. the sensors 3-1 through 3-n or perforations 14-1 through 14-n, depends upon the desired accuracy of the length measurement and may be e.g. sixteen. Further, this accuracy depends upon the winding speed and the thereto accommodated pulse frequency of the counting pulse generator 5 which may be in the order of 100 Kilocycles per second.

Figure 7:
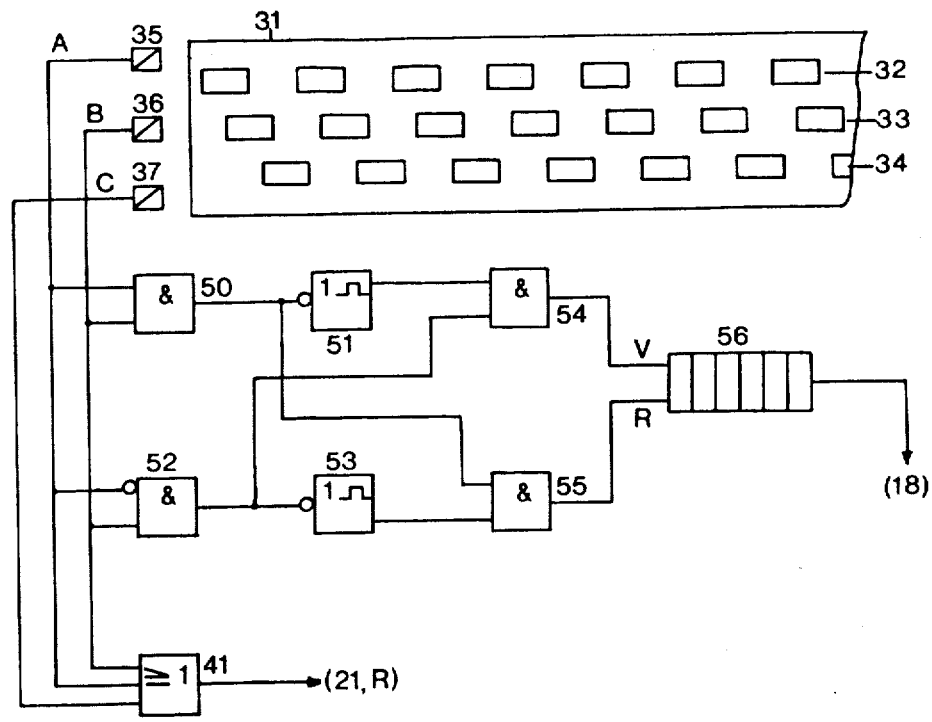
FIGS. 7 and 8 respectively depict a forth and modified embodiment and a thereto related schematic pulse diagram.

In the embodiment of FIG. 7, the oblong perforations or holes of the rows 32,33,34 are staggered by half the length of a perforation. Three sensors 35,36,37 are provided as in the arrangement of FIG. 5. In place of the circuits 38,39,40,42,43, FIG. 5, in FIG. 7 other circuits 50 through 56 are provided. The remaining circuits 1,5,18,19,20,21 are the same in both these embodiments and thus have been omitted in FIG. 7.

Figure 8:
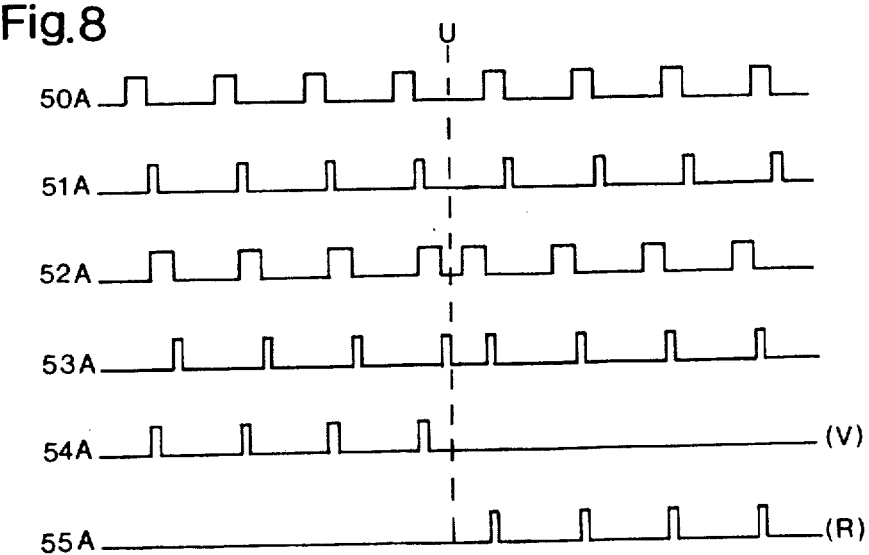

The sensor signals from the sensors 35,36 are supplied, through the lines A and B, firstly, to a first AND-gate 50, and secondly, to a second AND-gate 52 having a normal and a negated input. To the output of each AND-gate 50 and 52 there is individually connected a monoflop 51 and 53, respectively, each of which monflops responds to the negative going trailing edge of the related signals 50A and 52A, FIG. 8, delivered by AND-gate 50 and 52, respectively, such as to furnish output pulses 51A and 53A, respectively, of constant predetermined duration.

Further AND-gates 54 and 55 are provided for combining the signals 51A,52A and 50A,53A, respectively. Consequently, the AND-gate 54 furnishes a series of pulses 54A when the transfer member 31 moves from right to left. The pulses 54A are supplied to the forward terminal V of a bidirectional counter 56 where they are summed up. When the transfer member 31 moves in the opposite direction, the AND-gate 55 produces a series of pulses 55A which are supplied to the backward terminal R of the bidirectional counter 56 and are therein subtracted.

The output of the OR-gate 41 is connected to the reset terminal R of the counter 21, FIG. 5, and the output of the bidirectional counter 56 is connected with the input of the digital comparator 18.

The function or mode of operation of the here not shown circuits 1,5,18,19,20,21 and that of the OR-gate 41 is the same as described above with reference to FIG. 5.

While there are shown and described present preferred embodiments of the invention, it is to be distinctly understood that the invention is not limited thereto, but may be otherwise variously embodied and practiced within the scope of the following claims. Accordingly,

What I claim is:

1. Equipment for continuously measuring the length of endless material which is being wound-up upon a rotating core into a circular package upon a winding machine which comprises a movable member whose position depends on the diameter of the circular package, wherein the measuring equipment comprises:
- a movable transfer member mechanically coupled to the movable member of the winding machine and provided with three parallel rows of position markers staggered relative to each other in longitudinal direction of the rows;
- stationary transducer means for sensing the position of the transfer member without contacting the same and producing sensing signals during each revolution of the package dependent upon the diameter thereof;
- said stationary transducer means comprising three photoelectrical sensors each cooperating with one of the parallel rows of position markers;
- a cycle signal generator producing a cycle signal during each revolution of the package for controlling the delivery of the sensing signals;
- counting pulse generating means for generating a continuous series of counting pulses independent of the position of the transfer member;
- circuitry for generating a digital length measuring signal from the counting pulses and sensing signals occurring upon each cycle signal; and
- means for summing up consecutive digital length measuring signals.

* * * * *